(12) United States Patent
Giuffrida et al.

(10) Patent No.: US 8,232,010 B2
(45) Date of Patent: Jul. 31, 2012

(54) PROCESS AND CORRESPONDING APPARATUS FOR CONTINUOUSLY PRODUCING GASEOUS HYDROGEN TO BE SUPPLIED TO MICRO FUEL CELLS AND INTEGRATED SYSTEM FOR PRODUCING ELECTRIC ENERGY

(75) Inventors: Roberta Giuffrida, S G. Galermo (IT); Marco Antonio Salanitri, Catania (IT); Giuseppe Emanuele Spoto, Trecastagni (IT); Stefania Calamia, San Gregorio (IT); Salvatore Leonardi, Aci S. Antonio (IT); Salvatore Coffa, Tremestieri Etneo (IT); Roberta Zito, Modugno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1331 days.

(21) Appl. No.: 11/867,893

(22) Filed: Oct. 5, 2007

(65) Prior Publication Data

US 2008/0085433 A1   Apr. 10, 2008

(30) Foreign Application Priority Data

Oct. 6, 2006   (EP) .................................... 06425681
Oct. 6, 2006   (EP) .................................... 06425682

(51) Int. Cl.
*H01M 2/16* (2006.01)
*H01M 8/00* (2006.01)
(52) U.S. Cl. ...................................... 429/252; 429/400
(58) Field of Classification Search .................. 429/252, 429/400
See application file for complete search history.

(56) References Cited

U.S. PATENT DOCUMENTS

| | | | |
|---|---|---|---|
| 6,746,496 B1 * | 6/2004 | Kravitz et al. | 48/118.5 |
| 2003/0103878 A1 | 6/2003 | Morse et al. | |
| 2004/0052704 A1 * | 3/2004 | Devos | 422/234 |
| 2004/0076861 A1 | 4/2004 | Mann et al. | |
| 2004/0179980 A1 | 9/2004 | Pattekar et al. | |
| 2005/0074643 A1 | 4/2005 | Adams et al. | |

(Continued)

FOREIGN PATENT DOCUMENTS

EP   1 354 851 A1   10/2003

(Continued)

OTHER PUBLICATIONS

Karnik et al., "Towards a Palladium Micro-Membrane for the Water Gas Shift Reaction: Microfabrication Approach and Hydrogen Purification Results," J Microelectromechanical Systems 12(1): 93-100, Feb. 2003.

(Continued)

*Primary Examiner* — Lore Jarrett
(74) *Attorney, Agent, or Firm* — Seed IP Law Group PLLC

(57) ABSTRACT

A process for the production of hydrogen for micro fuel cells, comprises the successive steps of: continuously supplying a catalytic bed with an aqueous solution of sodium borohydride, the catalytic bed being made of at least one metal chosen among cobalt, nickel, platinum, ruthenium with obtainment of hydrogen and of a by-product comprising sodium metaborate, continuously recovering the hydrogen thus obtained and supplying, with said hydrogen as it is as obtained, a micro fuel cell which transforms hydrogen into electric energy. An apparatus provides continuous supply of hydrogen to a micro fuel cell. An integrated system structured for continuously producing and supplying hydrogen to a micro fuel cell and for converting the continuously supplied hydrogen into electric energy.

26 Claims, 7 Drawing Sheets

U.S. PATENT DOCUMENTS

| | | | |
|---|---|---|---|
| 2005/0135996 A1* | 6/2005 | Ortega et al. | 423/648.1 |
| 2005/0266281 A1 | 12/2005 | Adams et al. | |
| 2006/0292407 A1* | 12/2006 | Gervasio et al. | 429/19 |

FOREIGN PATENT DOCUMENTS

| | | |
|---|---|---|
| EP | 1 396 471 A2 | 3/2004 |
| EP | 1 496 014 A1 | 1/2005 |
| WO | WO 02/19452 A2 | 3/2002 |
| WO | WO 03/002247 A1 | 1/2003 |
| WO | WO 03/018468 A1 | 3/2003 |
| WO | WO 03/041187 A2 | 5/2003 |
| WO | WO 2005/050763 A1 | 6/2005 |
| WO | WO 2006/116638 A2 | 11/2006 |

OTHER PUBLICATIONS

Kelley et al., "A Miniature Methanol/Air Polymer Electrolyte Fuel Cell," Electrochemical and Solid-State Letters 3(9): 407-409, 2000.

Kelley et al., "Miniature Fuel Cells Fabricated on Silicon Substrates," AlChE Journal 48(5):1071-1082, May 2002.

Pattekar et al., "A Microreactor for Hydrogen Production in Micro Fuel Cell Applications," J Microelectromechanical Systems 13(1): 7-18, Feb. 2004.

\* cited by examiner

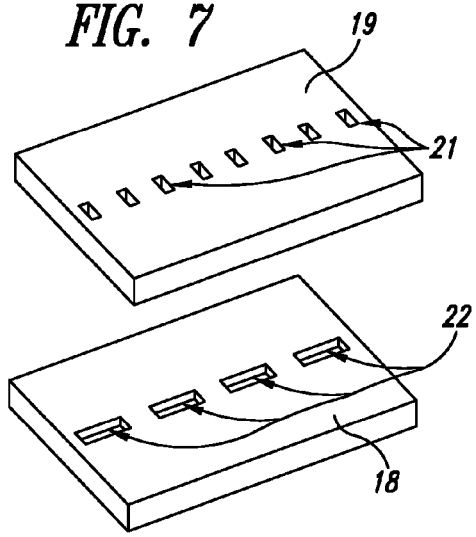
FIG. 7
FIG. 8
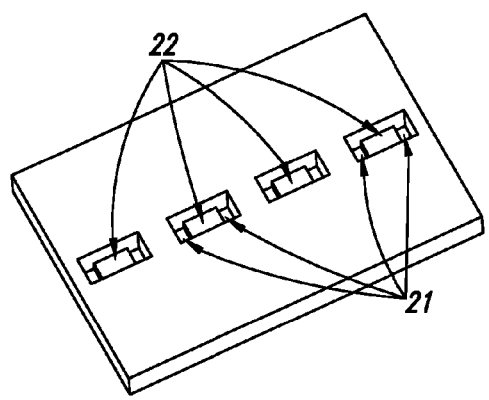
FIG. 9
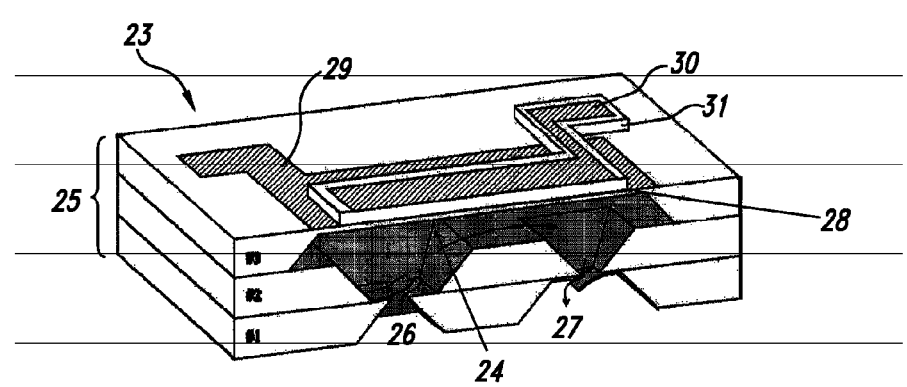
FIG. 10

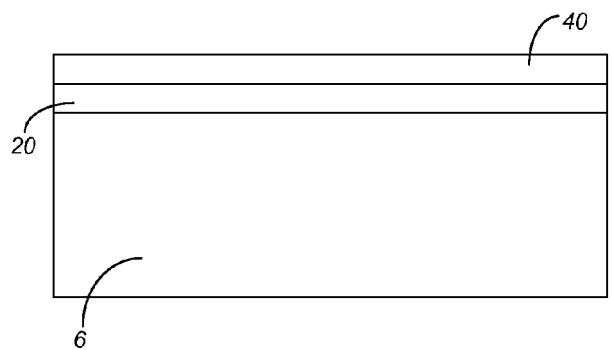
FIG. 11
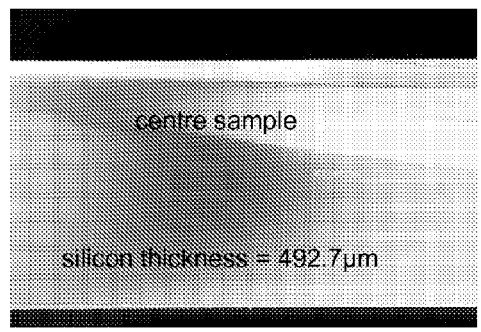
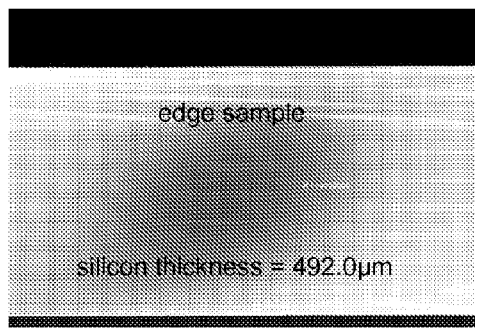
FIG. 12A                FIG. 12B
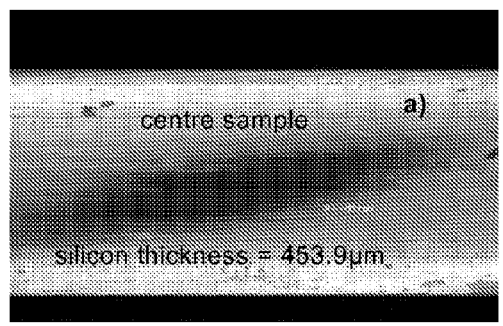
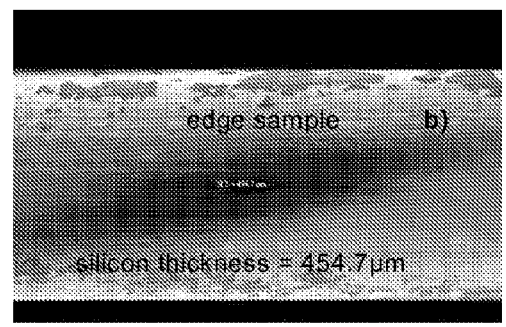
FIG. 12C                FIG. 12D total oxide thickness: 1.195 µm
rough oxide thickness: 86nm total oxide thickness: 1.218 µm
rough oxide thickness: 68nm

PROCESS AND CORRESPONDING APPARATUS FOR CONTINUOUSLY PRODUCING GASEOUS HYDROGEN TO BE SUPPLIED TO MICRO FUEL CELLS AND INTEGRATED SYSTEM FOR PRODUCING ELECTRIC ENERGY

BACKGROUND

1. Technical Field

In its most general aspect, the present invention relates to the industrial field of micro fuel cells, supplied with hydrogen, for generating electric energy, particularly but not exclusively intended for the operation of portable electronic devices.

In particular, the present invention relates to a process and a corresponding apparatus for continuously producing gaseous hydrogen to be supplied to micro fuel cells of the above type.

2. Description of the Related Art

It is known that the growing demand for electric energy to supply portable electronic devices has determined an intense, strong interest of the experts of the field in the identification, design and realization of new electric energy sources, in addition to and overcoming the traditional batteries used to date for the above scope, for example lithium ions batteries.

It is known that, among the new portable electric energy sources, great interest has been aroused by miniaturized fuel cells, hereafter indicated as micro cells, i.e., those devices capable of obtaining electric energy from a suitable fuel, for example through oxidation-reduction reactions.

In substance, micro cells are essentially energy converters which, by exploiting the energetic content of a chemical fuel, for example through an oxidation-reduction reaction, allow to produce electric energy in a reversible way, supplying collateral reaction products, in particular heat and water.

It is also known how, for some time, the researchers' attention to this industrial field is aimed at the identification of fuels which, suitably processed in respective micro cells, allow an easy, clean obtainment of electric energy, with high performances.

At present, hydrogen and methanol are the preferred fuels for the processing in micro cells of the considered type, in particular of the polymeric solid electrolyte type (Proton Exchange Membrane Fuel Cells).

The density of the power generated by these micro fuel cells, main requisite in portable applications, is strongly influenced by the type of fuel used.

It has been proved that this density of energy obtainable from a micro fuel cell supplied with hydrogen is, under the same conditions, higher by some orders of magnitude than the one obtainable from a similar micro cell supplied with methanol. Hydrogen is thus prima facie the fuel to be used in micro fuel cells for generating a high power density, like in the case of portable applications.

But is has also been proved that for obtaining, from a micro hydrogen cell, amounts of electric energy sufficient for a satisfying, prolonged operation of a respective portable electronic device, in particular amounts of energy sufficient for justifying a gradual substitution of the batteries currently used as portable energetic sources, it is necessary that said micro cell avails itself of a considerable hydrogen "reserve".

For the above purpose, and having taken into account the hydrogen production techniques used up to now, the very reduced dimensions of the portable electronic devices considered, such as those of the micro fuel cells associated with said devices, the above need can be satisfied by using small tanks (cylinders) wherein the hydrogen is stored at a gaseous state under very high pressures, or even liquefied at very low temperatures.

Known technical solutions for storing hydrogen compress hydrogen in the gaseous phase under high pressure, for example, equal to 200-350 bar at a temperature of 20° C. It is also known to store hydrogen in the liquid form at very low temperatures, for example, at −253° C. under a pressure of one bar.

The operative conditions (of temperature and pressure) for the storage of hydrogen in the liquid and gaseous forms realized according to the prior art can be summarized in the following table:

| Storage system | Temperature (° C.) | Pressure (bar) |
| --- | --- | --- |
| liquid $H_2$ | −253 | 1 |
| compressed $H_2$ | 20 | 200-350 |

Besides the known risk of highly dangerous manipulations of the hydrogen stored in small tanks under the above conditions, other drawbacks of the known techniques are exactly due to the fact that these manipulations must be carried out between the hydrogen production step and the step of its transformation into electric energy, involving respective methodologies, apparatuses and devices of difficult management and control. Moreover, as regards the hydrogen liquefaction, it is known that it implies a total loss of energy equal to 30%, since for maintaining the hydrogen in the liquid form it is necessary to preserve it at a temperature of −253° C. Moreover, for the conversion of the hydrogen into the liquid form, the prior art uses cryogenic containers which, besides being expensive instruments, require a reduction of the leaks of fuel through evaporation to the minimum.

For these reasons, the use of hydrogen as an energetic source in portable commercial systems has not yet found that great, advantageous widespread uses despite its potentials.

BRIEF SUMMARY

One embodiment provides a process and a corresponding apparatus for the production of hydrogen to be used in micro fuel cells having such functional and structural features as to overcome the drawbacks cited with reference to the prior art, reducing, in a substantial way, all the operative steps thereby provided between the hydrogen production and its transformation into electric energy.

More specifically, one embodiment provides a process for the production of hydrogen for micro fuel cells, comprising:

continuously supplying a catalytic bed with an aqueous solution of sodium borohydride ($NaBH_4$), the catalytic bed being made by at least one metal of the group VIIIB of the periodic table of the elements, in particular a metal chosen among cobalt (Co), nickel (Ni), platinum (Pt), and ruthenium (Ru) to provide hydrogen ($H_2$) and of a by-product comprising sodium metaborate ($NaBO_2$), continuously recovering the hydrogen thus obtained and supplying a micro fuel cell with said hydrogen as obtained.

Advantageously, said catalyst is ruthenium in a pulverulent form, finely dispersed in the respective catalytic bed. Further, preferably, the ruthenium is deposited through PVD techniques (Phase Vapor Deposition) or through sputtering.

Preferably, said aqueous solution of sodium borohydride ($NaBH_4$) is buffered at a pH between 13 and 14, and preferably at pH 14, through the addition of aqueous solution of sodium hydroxide (NaOH) at 4% by weight.

Another embodiment describes an apparatus for hydrogen production, comprising: a microreactor including a reaction chamber, a catalytic bed in said reaction chamber, said catalytic bed being made of at least one metal chosen among cobalt, nickel, platinum and ruthenium, a first tank for the aqueous solution of $NaBH_4$, a second tank for the reaction by-products, wherein said reaction chamber comprises:

a microchannel of predetermined length, in fluid communication, with said first and said second tank, and a semi-permeable membrane completely covering said microchannel along its whole length.

Advantageously, said catalytic bed is made of powdered ruthenium deposited on the bottom of said microchannel for at least part of the predetermined length thereof, in particular through PVD techniques (Phase Vapor Deposition) or through sputtering.

A further embodiment provides an integrated system comprising: a micro fuel cell and a microreactor for the production of gaseous hydrogen to be supplied to said micro fuel cell, wherein said micro fuel cell and said microreactor are realized by connecting silicon plates using wafer bonding technique.

Another embodiment provides an integrated system comprising: a micro fuel cell having an anode formed in a first silicon plate, a cathode formed in a second silicon plate, and a proton exchange membrane interposed between the anode and the cathode; a microreactor having a reaction chamber formed in a silicon plate, wherein the reaction chamber contains a catalyst selected from one or more Group VIIIB metals; and a semipermeable membrane interposed between the micro fuel cell and the microreactor, wherein the first and second silicon plates of the micro fuel cell are bonded with the silicon plate forming the microreactor.

The features and advantages of a process and a corresponding apparatus for the production of hydrogen, according to the present invention, will be apparent from the following description made with reference to the annexed drawings, given by way of indicative and non limiting example.

BRIEF DESCRIPTION OF THE DESCRIPTION OF THE RELATED DRAWINGS

FIG. 1 is a block scheme, which schematically shows a process for the production and supply of hydrogen to a micro fuel cell according to one embodiment;

FIG. 2 schematically shows, in a cross section, an apparatus according to one embodiment, for the actuation of the process of FIG. 1;

FIGS. 7 to 9 show an axonometric, exploded, enlarged view of a further detail of the apparatus of FIG. 2;

FIG. 10 shows a further enlarged view of a third detail of the apparatus of FIG. 2;

FIG. 11 shows a section, enlarged view of a fourth detail of the apparatus of FIG. 2; and FIGS. 12A-12D and 13A-13D show results of experimental tests carried out.

DETAILED DESCRIPTION

Figure 1:
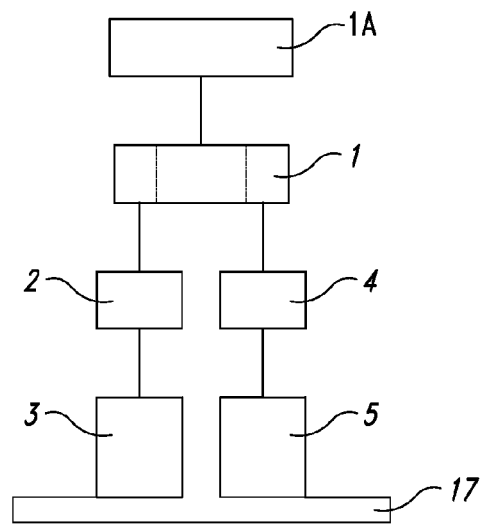

With reference to the block scheme of FIG. 1, a process is described for the production of hydrogen according to one embodiment, useful such as fuel in a micro FC (Micro Fuel Cell) 1A, intended for the production of electric energy for a generic portable electronic device, not shown.

A continuous flow of an aqueous solution of sodium borohydride ($NaBH_4$), stored at environmental temperature and pressure in a suitable tank 3, is supplied, by means of a micropump 2, to the reaction chamber of a microreactor 1.

Advantageously, for making this aqueous solution noninflammable and stable in the air, it is to be buffered at a pH between 13 and 14, and preferably at PH 14 by an aqueous solution of sodium hydroxide (NaOH), at 4% by weight.

In the reaction chamber of said microreactor 1, the above aqueous, alkaline solution of sodium borohydride ($NaBH_4$) comes into contact, for an appropriate and predetermined residence time, with a catalytic bed formed by a metal chosen in the group comprising Co, Ni, Pt and Ru. Preferably, the catalyst used is ruthenium in a pulverulent form, finely dispersed in the respective catalytic bed.

When $NaBH_4$ comes into contact with this catalyst, gaseous hydrogen is generated and freed from the aqueous solution of sodium borohydride ($NaBH_4$) according to the reaction:

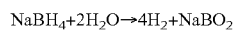

$$NaBH_4 + 2H_2O \rightarrow 4H_2 + NaBO_2$$

It is, in particular, an exothermic reaction, which occurs spontaneously at a temperature equal to 25° C.

While the solution of non-reacted sodium borohydride ($NaBH_4$) and the by-product sodium metaborate ($NaBO_2$), continuously discharged from the microreactor 1, are sent, by means of the same micropump 2, to a respective collection tank 5, the hydrogen ($H_2$) generated by the above catalytic reaction is sent as it is, at environment temperature and pressure, to the micro fuel cell (FC), which transforms $H_2$ generated into electric energy.

It is to be underlined that from the above indicated reaction, it occurs that for every 1 mole of sodium borohydride ($NaBH_4$) 4 moles of hydrogen ($H_2$) are obtained. Therefore, advantageously according to this embodiment, by using sodium borohydride ($NaBH_4$) as fuel solution, good percentages of hydrogen are produced in a stable way.

In particular, from 1 liter of 30 wt % $NaBH_4$ solution, stabilized with 4 wt % NaOH, having ruthenium as catalyst 14, about 66 gr. of liquid hydrogen are obtained, equivalent to 789 liters of gaseous hydrogen (equal to 7 wt % of hydrogen).

A further micropump 4 can be provided for emptying the reaction chamber of the microreactor 1, when desired, for example in the case of a desired stop of the supply of the aqueous solution of sodium borohydride ($NaBH_4$) to said reaction chamber.

The advantages attained by the process described above are, for example, as follows:

Great availability of the starting material, made of an aqueous solution of Sodium Borohydride ($NaBH_4$), easy to be prepared and manipulated as well;

High performance of the catalytic reaction in the microreactor, whose completion does not imply any danger and does not require particular and difficult controls or regulation interventions;

Production of hydrogen under ambient temperature and atmospheric pressure and subsequent possibility of supplying it as is to the micro fuel cell;

continuity of the hydrogen production;

Control of the production by means of simple regulation of the capacity of the supply of sodium borohydride ($NaBH_4$) aqueous solution to the microreactor and by means of controlling the time residence variations in contact with the catalyst and suitable variations of the amount of catalyst employed;

The by-product, sodium metaborate ($NaBO_2$) is non-toxic, easy to manipulate, soluble in water and possibly usable for regenerating sodium borohydride ($NaBH_4$).

A further embodiment provides an apparatus 100 for carrying out the above described process and, more in particular, to the structure of the microreactor 1 cited in the block scheme of FIG. 1.

Figure 2:
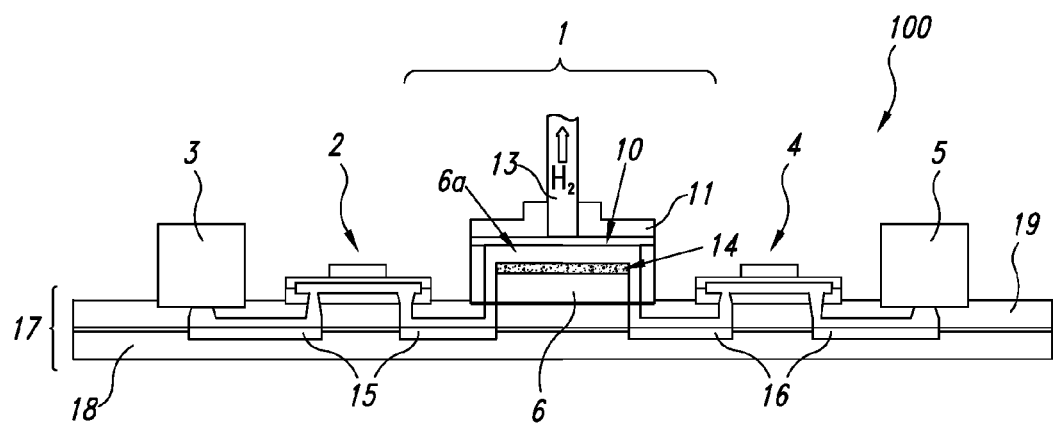

With reference to FIGS. 1 and 2, it is first to be noted that microreactor 1, micropumps 2 and 4, tanks 3 and 5, are mounted on a support platform 17 which, advantageously as it will result hereafter in the description, is formed by two plates 18 and 19 of a resin known as PYREX®, which are integrated with each other, for example by interposition of a suitable adhesive film.

Figure 3:
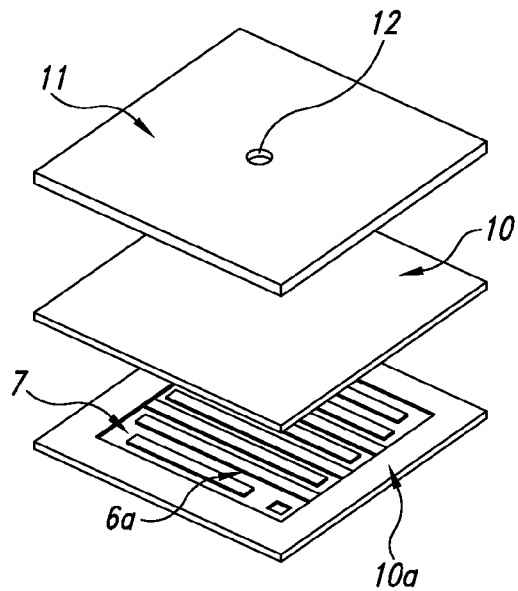
FIG. 3 shows an exploded, axonometric view of a microreactor composing the apparatus of FIG. 2.

With reference to FIGS. 2 and 3, the body of the microreactor 1 is essentially made of a plate 6, in particular a semiconductor material substrate of predetermined thickness, wherein a reaction chamber 6a is formed with known techniques hereafter specified.

In accordance with a preferred embodiment, this reaction chamber 6a in turn comprises a microchannel 7 made in the thickness of said plate body 6 and has a substantially winding and serpentine shape. Two through holes 8 and 9 are opened on the bottom 7a of said microchannel 7, in correspondence with respective opposite ends thereof. A semi-permeable membrane 10 (permeable to gases and impermeable to liquids) is fixed, with per se known techniques, onto said plate body 6, in juxtaposition to the wall thereof whereon said microchannel 7 is open. In particular, the membrane 10 is integrated with the plate body 6 thanks to the use of a layer 10a of adhesive formed, for example, by silicone resins.

A flat cover 11, realized with appropriate material, preferably a resin commercially known as PYREX®, is in turn juxtaposed to said membrane 10, blocking it substantially as a sandwich on the plate body 6 of the microreactor 1. Said flat cover 11 is centrally equipped with an opening 12 intended for being engaged by a conduit 13, provided for the release, from the reaction chamber 6a, of the hydrogen and possible other gases produced therein, as it will be apparent hereafter in the description. Between the flat cover 11 and the membrane 10 an air-casing "collecting" the hydrogen produced is also defined.

Advantageously, this membrane 10 ensures the correct operation of the microreactor 1 in any position and orientation, not allowing an undesired leak of the fuel solution of sodium borohydride ($NaBH_4$).

Figure 5:
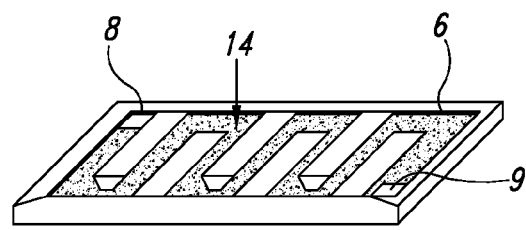

A catalyst of suitable granulometry, preferably, ruthenium, is deposited on the bottom 7a of the entire serpentine-like microchannel 7 so as to form a catalytic bed 14 therein (see, FIG. 5).

In a preferred embodiment, the catalyst is suitably deposited on the bottom of the microchannel 7 of the microreactor 1 by sputtering or PVD techniques (Phase Vapor Deposition) using a target or precursor of solid ruthenium, thus realizing a deposited solid catalytic layer.

The serpentine-like microchannel 7, which, as said, constitutes the reaction chamber 6a of the microreactor 1 of the present invention, is in fluid communication with the tank 3 of the aqueous solution of sodium borohydride ($NaBH_4$) and with the tank 5 of the by-products of the reaction by means of respective microconduits 15 and 16 formed and extended in the thickness of the support platform 17. In said microconduit 15 the micropump 2 withdraws the aqueous solution of sodium borohydride ($NaBH_4$) from the tank 3 and delivers the same solution to the reaction chamber 6a. As already specified, this micropump 2 also takes care of sending to the tank 5 the by-products of the reaction through the microconduit 16.

In the microconduit 16, the micropump 4 is active, the latter being mainly provided, as above specified, for emptying the reaction chamber 6a (or serpentine-like microchannel 7) of its content on the occasion of a possible shut-down of the micropump 2.

Figure 4:
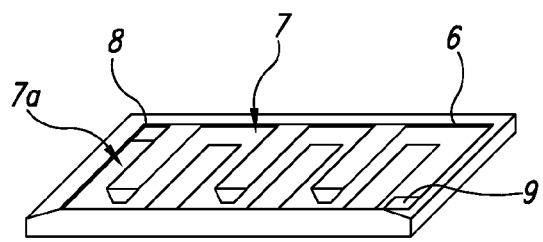
FIGS. 4 to 6, show an enlarged, axonometric view of a detail of FIG. 3, in different steps of its realization.

In a preferred embodiment, the plate body 6 of the microreactor 1 is micro-worked with the MEMS technology (Micro-electro-mechanical system), the microchannel 7 being trenched by micro-machines by removing portions of the plate body 6 of a semiconductor substrate, as shown in FIG. 4.

In a preferred embodiment, this removal of portions is realized with a photolithographic process using photolithographic masks "in negative" with respect to the portions to be removed. In particular, these photolithographic masks are realized so as to leave the portions to be removed uncovered, protecting the rest of the semiconductor substrate realizing the plate body 6 from a successive anisotropic chemical etching step used for removing these portions. The anisotropic chemical etching step is for example realized in wet conditions with potassium hydroxide (KOH).

Advantageously, as shown in FIG. 5, the catalyst 14 is deposited on the bottom of the serpentine microchannel 7 by using sputtering or PVD techniques (Phase Vapor Deposition) using a shadow mask for protecting areas of the microreactor 1 which must be crossed by the solution of Sodium Borohydride ($NaBH_4$) or fuel solution. In this way the catalyst, which represents the most expensive component of the microreactor 1, is deposited only on a portion of a bottom wall of the reaction chamber 6a realized by the microchannel 7.

Figure 6:
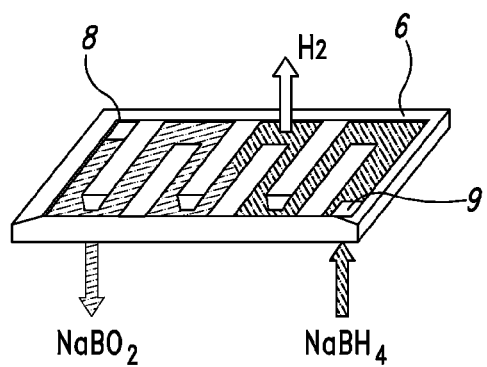
Figure 13A:
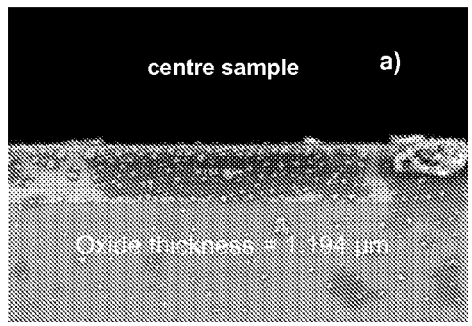
Figure 13B:
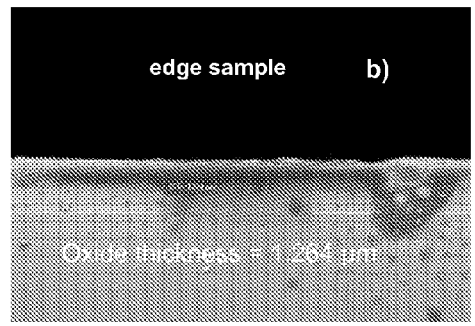
Figure 13C:
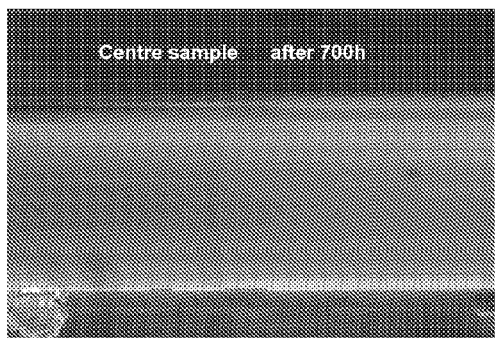
Figure 13D:
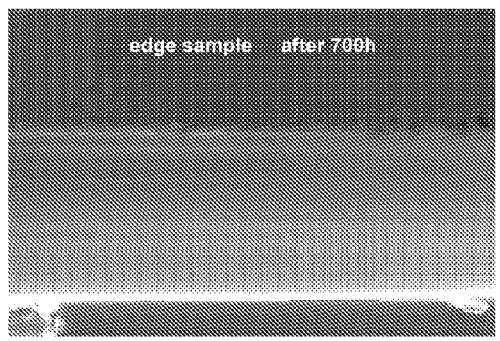

As already highlighted, by introducing into the reaction chamber 6a, i.e., into the microchannel 7, the solution of sodium borohydride ($NaBH_4$), as shown in FIG. 6, hydrogen ($H_2$) and sodium metaborate ($NaBO_2$) are produced, as schematically shown in FIG. 6.

Advantageously, as above explained, the production of hydrogen occurs just after the solution of sodium borohydride ($NaBH_4$) enters into contact with the catalyst in the reaction chamber 6a.

As already said, the support platform 17 is formed by two separated portions 18, 19 made integral with each other, for example by means of an adhesive film.

As shown in FIGS. 7 and 8, each of these two portions 18, 19 contains some grooves 21, 22 suitably dimensioned and positioned which, subsequently to the union of the portions 18, 19, realize the microconduits 15 and 16 and suitable inlets and outlets of the single components of the apparatus, in particular, the tanks 3 and 5 and the micropumps 2 and 4.

In particular, as shown in FIG. 9, the grooves 21 of the upper portion 19 of the support platform 17 realize these inlets and outlets, while the grooves 22 of the lower portion 18 of the support platform 17 realize the buried microconduits 15 and 16.

Advantageously, each tank 3, 5 mounted on the support platform 17 is interchangeable and removable like a cartridge. In particular, as soon as the fuel solution, in particular the solution of sodium borohydride ($NaBH_4$), is completely exhausted, the first tank 3 is replaced with another tank filled with a sodium borohydride solution for the continuity of the hydrogen production by the proposed apparatus.

These tanks 3, 5 are equipped with mechanical valves, for example made of suspended diaphragms, and are automatically opened thanks to the pressure exerted for the installation of the same tanks 3, 5 on the support platform 17. The filling of the microchannels 15 and 16—which realize a fluidic circuit inside the apparatus 100 according to the invention for the transportation of the solution of sodium borohydride ($NaBH_4$)—occurs by gravity up to the first micropump 2, subsequently the same will drive the solution inside the reaction chamber 6a.

The micropumps 2, 4 thus control the flow of sodium borohydride ($NaBH_4$) solution and are rigidly fixed to the support platform 17, for example through the use of gluing resins, holes for the inlet and the outlet of these micropumps 2, 4 being aligned with the through holes 21 made in the upper portion 19 of the support platform 17.

In a preferred embodiment of the apparatus according to the invention, the micropumps 2, 4 are of the piezoelectric type and offer a high degree of miniaturization. These piezoelectric micropumps vary the flow of fluid (liquid or gas) crossing them according to the vibration frequency of a piezoelectric element comprised therein.

An embodiment of a piezoelectric pump is shown in FIG. 10.

In particular, the piezoelectric pump 23 comprises a flow channel 24 realized in a semiconductor substrate 25 connected to an input valve 26 and to an output valve 27.

An upper portion of the flow channel 24 is formed by an activation membrane 28.

On the activation membrane 28, outside the flow channel 24, a metallic lower electrode 29 and a metallic upper electrode 30 are formed in cascade, the latter being surrounded by a layer 31 of piezoelectric material.

When a voltage in frequency is applied, the layer 31 of piezoelectric material starts to vibrate, deforming the activation membrane 28 whereon it is realized, thus transferring the energy to the fluid flowing in the flow channel 24.

Further advantageously, for obstructing the corrosive action exerted by the aqueous solution of sodium borohydride ($NaBH_4$) and sodium hydroxide ($NaOH$) on the silicon substrate where the reaction chamber 6a is realized, the microchannel 7, in particular its bottom, is protected with an oxide layer 20, in particular silicon oxide ($SiO_2$).

In this way, the correct operation of the apparatus 100 according to the embodiment is also ensured for long periods of time.

In particular, this oxide layer 20 is deposited by means of a thermal process and, on it, the catalyst (ruthenium) is then deposited with physical deposition techniques in vapor phase (PVD), as above indicated.

Through experimental analyses, it is in fact possible to verify that the solution of sodium borohydride ($NaBH_4$) and sodium hydroxide ($NaOH$) is corrosive with respect to the silicon wafer wherein the reaction chamber 6a is realized since it is strongly alkaline.

In particular, the corrosion of the silicon substrate can irreversibly spark off if localized peeling off occur between the catalytic layer and the substrate. For example, in the event of an imperfect deposition of the catalyst, the erosion due to the friction of the fluid with the microchannel 7 of the reaction chamber 6a can produce areas, also of modest extension, wherein the substrate is directly in contact with the solution containing the hydrogen. From these areas or micro-fractures the erosion of the substrate starts in an uncontrollable way and brings, in a short time, to the progressive corrosion of the silicon and to the consequent peeling off of the catalytic bed.

The phenomenon is thus self-supplied and irreversible. If, instead, in order to prevent the potentially dangerous microfractures, the solution meets a protective layer formed by silicon oxide, the corrosion described does not occur and, therefore, the microreactor 1 can continue to be safely employed in time.

A portion of the microchannel 7 thus obtained is schematically shown in section in FIG. 11, this section being drawn not to scale but so as to emphasize the important features of the invention. In particular, on the silicon substrate, which realizes the body plate 6 of the microreactor 1, an oxide layer 20 is deposited, in particular silicon oxide, whereon a catalyst layer 40 is deposed.

To evaluate the corrosion speed of the silicon substrate by the solution of sodium borohydride ($NaBH_4$), a sample of non patterned silicon is immersed in this solution. The thickness of the silicon sample has been evaluated by means of SEM analysis prior to and after the contact with the solution.

The results of these experimental analyses are shown in FIGS. 12A-12D, reporting the SEM images relative to the silicon thicknesses in the center (FIG. 12A) and to the edge of the sample (FIG. 12B) prior to the contact with the solution of Sodium Borohydride ($NaBH_4$) and to the same thicknesses in the center (FIG. 12C) and to the edge of the sample (FIG. 12D) after a contact of 12 hours with the solution of sodium borohydride ($NaBH_4$). It occurs that the consumption of silicon in thickness is 38 μm and the surface is corroded with an etching speed of 3.17 μm/h.

Further, FIGS. 13A-13D report the experimental results, always relatively to the thicknesses of silicon in the center and at the edge of the sample prior to and after the immersion of the solution of Sodium Borohydride ($NaBH_4$) respectively, obtained by using a protective layer of silicon thermal oxide having thickness of 1.300 μm. It occurs that, after a contact of 700 hours with this solution, the oxide surface is rougher but no changes of thickness are evident, the mean thickness value of silicon oxide between sample center and edge remaining substantially unchanged.

In conclusion, the apparatus 100 according to one embodiment carries out the continuous production of hydrogen through the reaction of a solution of sodium borohydride ($NaBH_4$), this hydrogen production advantageously occurring at ambient temperature and atmospheric pressure thanks to the use of a suitable catalyst.

Advantageously, the catalyst is deposited on the bottom of a serpentine and winding microchannel of a reaction chamber of the microreactor, in particular by using sputtering or PVD (Phase Vapor Deposition) techniques.

The apparatus for the production of hydrogen according to the invention comprises a microreactor and further micro components for the control and the modulation of the hydrogen production independent from the use orientation, thanks to the insertion of a semi-permeable membrane between the reaction chamber and the outlet conduit of the hydrogen in the microreactor.

All the components of the apparatus, except for the tanks, can be realized by using the micro-processing techniques developed for the manufacturing of integrated circuits, which allow for a high dimensional control and very high processing accuracy typical of photolithographic processes. Therefore, this apparatus can be manufactured on an industrial scale and at low costs.

Figure 14:
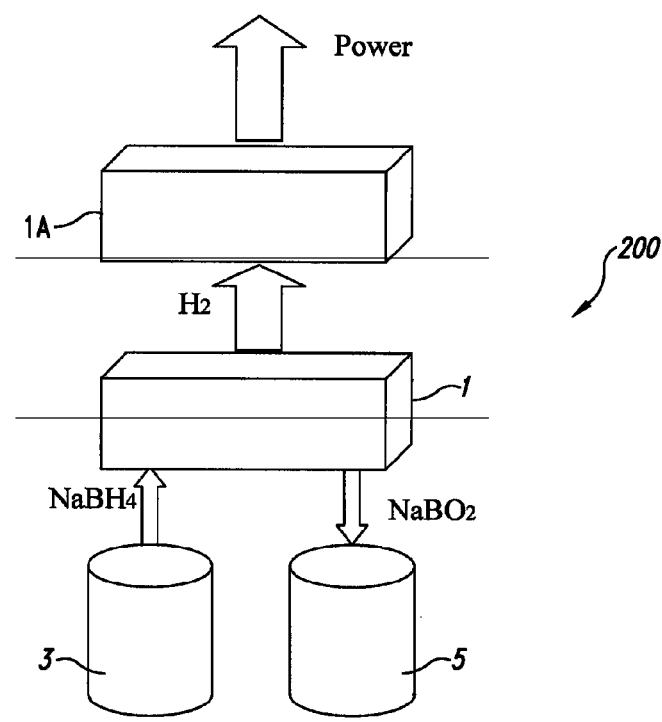
FIG. 14 is a block scheme schematically showing an integrated system for the production of energy according to one embodiment.

In a further embodiment, with reference to the block scheme of FIG. 14, an integrated system for the production of energy is described, intended for the supply of a generic portable electronic device, not shown.

In particular, the integrated system 200 for the production of energy comprises a micro fuel cell 1A and a microreactor 1 for the production of hydrogen ($H_2$) to be supplied to said micro fuel cell 1A, which transforms the hydrogen into electric energy, indicated with Power in FIG. 14.

The integrated system 200 for the production of energy also comprises a first tank 3 for storing a fuel solution and a second tank 5 for collecting the non-reacted fuel solution and the reaction by-products, both suitably in fluid communication with the microreactor 1.

Figure 16:
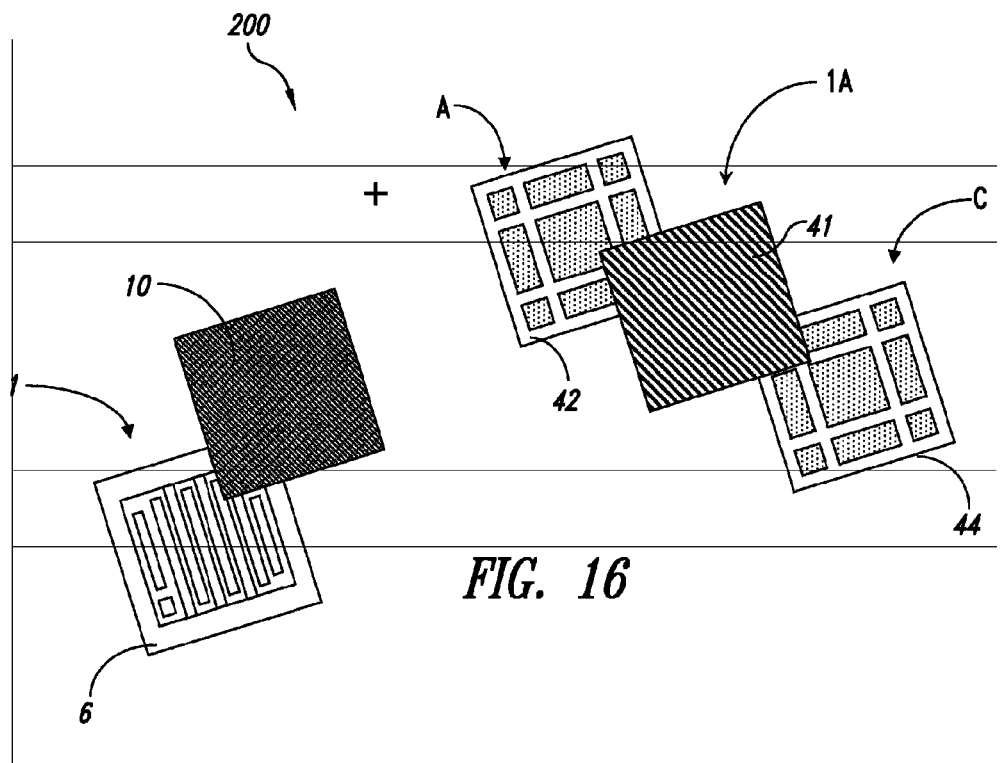
FIG. 16 shows an axonometric, exploded view of the integrated system according to an embodiment.
Figure 17:
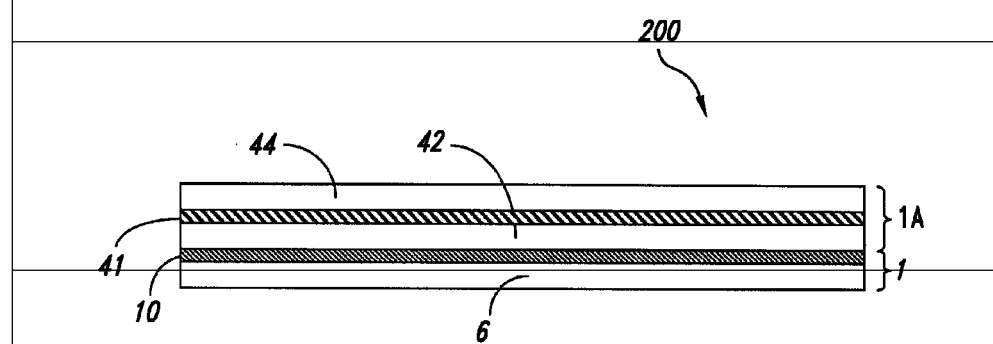
FIG. 17 shows a further enlarged, section view of the integrated system of FIG. 16.

With reference to FIGS. 4, 16 and 17, the body of the microreactor 1 is essentially constituted of a plate 6, in particular a silicon plate, of predetermined thickness, wherein, as discussed in connection with FIG. 4, a reaction chamber 7a is formed.

According to a preferred embodiment, this reaction chamber 7a in turn comprises a microchannel 7, made in the thickness of said plate 6 and is arranged in substantially serpentine or winding shape. Two through holes, 8 and 9, are opened on the bottom of said microchannel 7, in correspondence with respective opposite ends thereof. A semi-permeable membrane 10 (permeable to gases and impermeable to liquids) is fixed, with known techniques, on said plate 6, in juxtaposition to the wall thereof whereon said microchannel 7 is open. In particular, the membrane 10 is integrated with the plate 6 thanks to the use of an adhesive layer formed, for example, by silicon resins.

In substance, the integrated system 200 for the production of energy comprises the micro fuel cell 1A and the microreactor 1, both formed by silicon plates having the same dimensions. Advantageously, these plates are micro-worked, in particular through the MEMS (micro-electro-mechanical system) technology, and connected to each other by means of the wafer bonding technique. The layout of these plates requires through holes, obtained by means of a double etching (etching both side), which allow the passage of the hydrogen produced by the microreactor 1 to the anode A of the micro fuel cell 1A and of the air to the cathode C of the same.

Further advantageously, the microchannel 7 in the microreactor 1 is also realized with the MEMS technology.

It is suitable to underline that the microreactor 1 for the production of hydrogen to be supplied to the anode A of the micro fuel cell 1A is integrated with the micro cell itself.

Advantageously, the micro fuel cell 1A also comprises a membrane MEA 41 pressed inside two silicon plates, 42 and 44, micro-worked, in particular realized with the MEMS technology, suitable to form the anode A and the cathode C of the micro cell, as shown in FIGS. 16 and 17.

Moreover, a suitable catalyst comprising at least one metal of the group VIIIB of the periodic table of the elements, in particular a metal chosen among cobalt (Co), nickel (Ni), platinum (Pt), ruthenium (Ru), preferably platinum, is placed on the membrane MEA 41 for allowing the reaction of the gaseous hydrogen produced by the microreactor 1 and its transformation into ions $H^+$.

In particular, as it will be better clarified hereafter in the description, once activated, the microreactor 1 produces hydrogen, which, through the membrane 10—separating the gas from the liquid—suitably connected thereto, reaches the anode A of the micro fuel cell 1A. When the hydrogen passes through holes of the silicon plate 42 which realize the anode A of the micro fuel cell 1A, it meets the membrane MEA 41 where it reacts, thanks to the presence of the catalyst placed thereon, to give electrons and ions $H^+$.

These $H^+$ ions, transiting through the membrane 10, reach the cathode C of the micro fuel cell 1A, where, together with the oxygen in the air and acceding to the micro cell through the silicon plate 44 which realize this cathode C, react to form water and produce heat.

The electrons instead, through an external electric circuit connected to the integrated system 200 for the production of energy, constitute the current supplied by the micro fuel cell 1A and complete the reaction at the cathode C where the electrons rejoin the $H^+$ ions to regenerate the hydrogen atoms, before the hydrogen atoms react with the oxygen to form water.

To verify the flow of hydrogen produced from a solution of sodium borohydride with the ruthenium catalyst, experimental tests have been carried out by using a microreactor containing an alkaline solution of $NaBH_4$, there being an amount of catalyst in the form of pellets of ruthenium (Ru on $Al_2O_3$ in the amount of 0.5% by weight).

Figure 15:
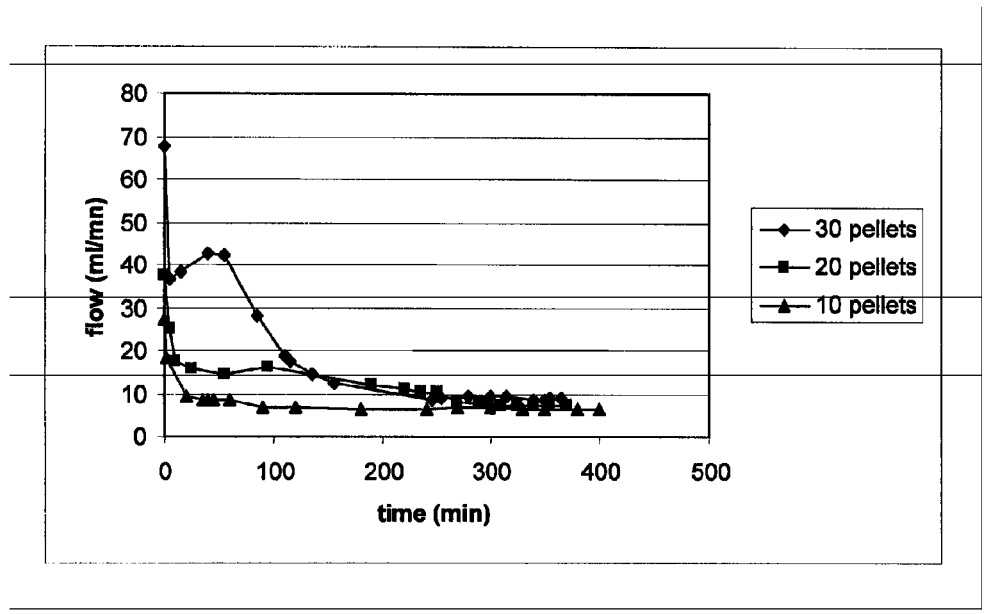
FIG. 15 shows the pattern vs. time of a flow of energy obtained with the microreactor of FIG. 3 when its operation conditions vary.

The results of these experimental tests are shown in FIG. 15 where the flow is reported of hydrogen produced as a function of the time when the number of pellets and thus the amount of catalyst varies.

As it is understood from FIG. 15, the hydrogen flow, as the number of pellets increases from 10 to 20 up to 30, is steady after about 3 hours from the start of the hydrogen production reaction, respectively at about 6.5, 7.3, 8.5 ml/mn.

Further advantageously, the sodium metaborate ($NaBO_2$), which is obtained as by-product of the reaction, is soluble in water, is not polluting and, thanks to the membrane 10 separating the gas from the liquid interposed between the microreactor 1 and the anode A of the micro fuel cell 1A, does not reach the anode. The only product besides hydrogen that reaches the anode A of the micro fuel cell 1A is thus water vapor, suitably usable for wetting the solid electrolyte of the membrane MEA of the micro fuel cell 1A.

Thus, one embodiment provides an integrated system comprising: a micro fuel cell and a microreactor for the production of gaseous hydrogen to be supplied to said micro fuel cell, wherein said micro fuel cell and said microreactor are realized by connecting silicon plates using wafer bonding technique.

In another embodiment, the integrated system further comprises a first tank for storing a fuel solution and a second tank for storing reaction by-products and wherein said microreactor comprises: a silicon plate wherein a reaction chamber is realized, the reaction chamber comprising at least one microchannel of a length in fluid communication at opposite ends with said first and said second tanks respectively; and a semipermeable membrane covering said microchannel along its whole length.

In another embodiment, the micro fuel cell of the integrated system comprises: a first silicon plate which realizes an anode; and a second silicon plate which realizes a cathode, the first and second silicon plates being superimposed onto each other and separated by a proton exchange polymeric membrane.

In another embodiment, the silicon plates of the integrated system are micro-worked.

In another embodiment, in the integrated system, said silicon plates have substantially identical dimensions.

In another embodiment, in the integrated system, each of said silicon plates comprises through holes obtained through double etching.

In another embodiment, in the integrated system, said microchannel is essentially a serpentine channel extended in said silicon plate forming said microreactor.

In another embodiment, in the integrated system, said microchannel is realized in said silicon plate by micro-working techniques.

In another embodiment, in the integrated system, a catalyst comprising at least one metal chosen among cobalt, nickel, platinum and ruthenium is placed on said polymeric proton exchange membrane.

In another embodiment, in the integrated system, said reaction chamber includes a catalytic bed having at least one metal chosen among cobalt, nickel, platinum and ruthenium.

In another embodiment, in the integrated system, said catalytic bed includes ruthenium, deposited, on a bottom of said microchannel for at least part of the length thereof.

In another embodiment, in the integrated system, said semipermeable membrane is made integral with said silicon plate realizing said microreactor by an adhesive layer.

In another embodiment, in the integrated, said first and said second tanks are interchangeable cartridges and provided with suitable mechanical valves which are automatically opened under a pressure exerted in case of installation of said first and second tanks on a support platform of said system.

In another embodiment, in the integrated system, said microchannel is protected by an oxide layer whereon a layer of said catalyst is deposited.

In another embodiment, in the integrated system, the fuel solution comprises sodium borohydride.

In another embodiment, in the integrated system, the fuel solution has a pH value between about 13 and 14.

A further embodiment provides an integrated system comprising: a micro fuel cell having an anode formed in a first silicon plate, a cathode formed in a second silicon plate, and a proton exchange membrane interposed between the anode and the cathode; a microreactor having a reaction chamber formed in a silicon plate, wherein the reaction chamber contains a catalyst selected from one or more Group VIIIB metals; and a semipermeable membrane interposed between the micro fuel cell and the microreactor, wherein the first and second silicon plates of the micro fuel cell are bonded with the silicon plate forming the microreactor.

In one embodiment, in the integrated system, the reaction chamber contains one or more metals selected from cobalt, cobalt, nickel, platinum and ruthenium.

In another embodiment, in the integrated system, the reaction chamber is in fluid communication with a first tank and a second tank.

In another embodiment, in the integrated system, the reaction chamber is a winding microchannel formed in the silicon plate, the winding microchannel being in fluid communication at its respective ends with the first tank and the second tank, respectively.

In another embodiment, in the integrated system, the first tank continuously supplies an aqueous solution of sodium borohydride to the winding microchannel, whereby hydrogen is produced in the presence of the catalyst.

In another embodiment, in the integrated system, the second tank continuously receives a by-product of the hydrogen production.

In another embodiment, in the integrated system, the proton exchange membrane comprises one or more metals selected from cobalt, cobalt, nickel, platinum and ruthenium.

In conclusion, the process and the corresponding apparatus and integrated system for the continuous production and supply of gaseous hydrogen to be supplied to micro fuel cells overcome the drawbacks in the prior art and further show the following advantages:

the catalytic electrochemical reaction managing the hydrogen production can be controlled through the amount of catalyst used in the reaction chamber of the microreactor;

the microreactor does not need energy for producing hydrogen, operates at ambient temperature and atmospheric pressure and produces hydrogen only according to the demand;

the microreactor and all its components can be miniaturized, allowing to realize a portable energy source;

the catalytic reaction of an aqueous solution of sodium borohydride ($NaBH_4$) is a more economic method for producing hydrogen with respect to the methods used in the prior art and does not produce acid compounds or caustic vapors as it occurs in other production systems, for example by using solutions comprising Ca/water and Zn/acid;

hydrogen is the only gas produced therefore neither the consumption nor the degradation or the so called "poisoning" of the catalyst occur, the catalyst being operated for example by reactions which produce carbon dioxide ($CO_2$) as in the case of methanol-supplied systems;

if the apparatus is heated, the water vapors produced by the electrochemical reaction realized therein mix with the hydrogen produced, which is highly desirable for a micro fuel cell system since the water vapors, wetting the hydrogen flow, improve the membrane performances (thanks to a decrease of the inner resistance);

the reaction speed is constant and thus allows to have hydrogen produced in a stable way for a period of time, the apparatus can be used for the hydrogen supply and integrated with micro fuel cells to provide energy in portable electronic devices.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A process comprising:
    continuously supplying and contacting a catalytic bed with an aqueous solution of sodium borohydride, the catalytic bed being in a semiconductor body and including at least one metal selected from the group consisting of cobalt, nickel, platinum, and ruthenium;
    obtaining hydrogen and a by-product including sodium metaborate;
    continuously recovering the hydrogen thus obtained; and
    supplying a micro fuel cell in the semiconductor body with said hydrogen as it is as obtained, the micro fuel cell transforming the hydrogen into electric energy.

2. The process according to claim 1 wherein said catalytic bed includes finely dispersed ruthenium in a pulverulent form.

3. The process according to claim 1 wherein said aqueous solution of sodium borohydride is buffered with a pH of between about 13 and 14, through an aqueous solution of sodium hydroxide, at 4% by weight.

4. The process according to claim 1, further comprising: continuously discharging a non-reacted portion of the sodium borohydride solution and the by-product including sodium metaborate into a respective collection tank.

5. The process according to claim 4 wherein said aqueous solution of sodium borohydride is stored at ambient temperature and atmospheric pressure in a storage tank and is supplied by said micropump to said reaction chamber.

6. The process of claim 4 wherein continuously discharging includes pumping the non-reacted sodium borohydride and the by-product by a micropump formed in the semiconductor body.

7. The process according to claim 1 wherein obtaining hydrogen includes contacting said aqueous solution of sodium borohydride with said catalytic bed.

8. The process according to claim 1 wherein the supplying includes delivering hydrogen through a semipermeable membrane to an anode of the micro fuel cell, wherein the hydrogen passes through holes of the anode, and is converted to hydrogen ions and electrons in the presence of a catalyst placed on a polymeric proton exchange membrane.

9. An apparatus comprising:
a microreactor having a reaction chamber that includes a catalytic bed, said catalytic bed including at least one metal selected from the group consisting of cobalt, nickel, platinum and ruthenium;
a first tank structured to store an aqueous solution of sodium borohydride; and
a second tank structured to store reaction by-products comprising sodium metaborate, wherein said reaction chamber comprises a microchannel formed in a semiconductor body, the microchannel being of a length, in fluid communication, at opposite ends thereof, with said first and said second tanks respectively; and a semi-permeable membrane completely covering said microchannel.

10. The apparatus according to claim 9 wherein said catalytic bed is made of ruthenium deposited, on a bottom of said microchannel for at least part of the length of the microchannel.

11. The apparatus according to claim 10 wherein said microchannel is substantially a serpentine channel extended in the semiconductor body of a thickness of said microreactor.

12. The apparatus according to claim 11 wherein said plate body is a silicon plate.

13. The apparatus according to claim 9 wherein said microreactor and said first and second tanks are mounted on a support platform.

14. The apparatus according to claim 13 wherein said support platform includes first and second microconduits respectively for putting said first and second tanks in fluid communication with said reaction chamber.

15. The apparatus according to claim 14 further comprising a micropump structured to withdraw the aqueous solution of sodium borohydride from said first tank through the first microconduit, and deliver the sodium borohydride solution to the reaction chamber and forward to said second tank the solution of non-reacted sodium borohydride and reaction by-products comprising sodium metaborate through said second microconduit.

16. The apparatus according to claim 15 further comprising a micropump in said second microconduit for emptying said reaction chamber of its content.

17. The apparatus according to claim 15 wherein said micropumps are piezoelectric flow control micropumps of the piezoelectric type which vary the fluid flow crossing them according to a vibration frequency of a piezoelectric element comprised therein.

18. The apparatus according to claim 14 wherein said support platform includes two separated portions integrated with each other by an adhesive film, each of said two separate portions comprising grooves that provide microconduits, input and output openings of the apparatus mounted on said support platform.

19. The apparatus according to claim 9 further comprising a flat cover sandwiching said semi-permeable membrane on said plate body, said flat cover being centrally equipped with an opening for releasing the produced hydrogen from said reaction chamber.

20. The apparatus according to claim 9 wherein said membrane is made integral with said plate body by an adhesive layer.

21. The apparatus according to claim 9 wherein said microchannel is protected with an oxide layer, which is further coated with a layer of said catalyst.

22. A process comprising:
flowing an aqueous solution of sodium borohydride in a flow path formed in a semiconductor body, the flow path being coated with a catalyst including one or more Group VIIIB metals, the aqueous solution of sodium borohydride contacting the catalyst to produce hydrogen gas and sodium metaborate; and
delivering the hydrogen gas to a micro fuel cell.

23. The process of claim 22 wherein the catalyst is cobalt, nickel, platinum or ruthenium.

24. The process of claim 22 further comprising converting the hydrogen gas into electric energy.

25. An integrated system comprising:
a micro fuel cell integrated in a first silicon plate; and
a microreactor configured to supply gaseous hydrogen to said micro fuel cell and integrated in a second silicon plate, wherein said first silicon plate and the second silicon plate are bonded together.

26. The integrated system of claim 25, further comprising:
a semipermeable membrane interposed between the micro fuel cell and the microreactor, wherein the first silicon plate of the micro fuel cell is bonded with the second silicon plate of the microreactor.

* * * * *